United States Patent
Wei et al.

(10) Patent No.: US 10,901,858 B2
(45) Date of Patent: Jan. 26, 2021

(54) AUTOMATED DISASTER RECOVERY SYSTEM AND METHOD

(71) Applicant: FALCONSTOR, INC., Melville, NY (US)

(72) Inventors: Po-Hsin Wei, Taipei (TW); Andrew Spyros Malitzis, Old Bethpage, NY (US); Andrew Lee Modansky, Rockville Centre, NY (US); Sheng-Chang Chang, Taipei (TW)

(73) Assignee: Falconstor, Inc., Austin, TX (US)

(*) Notice: Subject to any disclaimer, the term of this patent is extended or adjusted under 35 U.S.C. 154(b) by 0 days.

(21) Appl. No.: 16/123,812

(22) Filed: Sep. 6, 2018

(65) Prior Publication Data
US 2019/0004905 A1  Jan. 3, 2019

Related U.S. Application Data

(63) Continuation of application No. 13/909,746, filed on Jun. 4, 2013, now Pat. No. 10,073,745.
(Continued)

(51) Int. Cl.
G06F 11/00 (2006.01)
G06F 11/14 (2006.01)
(Continued)

(52) U.S. Cl.
CPC ...... *G06F 11/1464* (2013.01); *G06F 11/1415* (2013.01); *G06F 11/1451* (2013.01);
(Continued)

(58) Field of Classification Search
CPC .... G06F 9/4411; G06F 9/4416; G06F 9/4856; G06F 9/4558; G06F 9/4875;
(Continued)

(56) References Cited

U.S. PATENT DOCUMENTS

| | | |
|---|---|---|
| 5,375,232 A | 12/1994 | Legvold |
| 5,497,483 A | 3/1996 | Beardsley |

(Continued)

FOREIGN PATENT DOCUMENTS

| | | |
|---|---|---|
| CN | 101308463 | 11/2008 |
| TW | 200845765 | 11/2008 |

OTHER PUBLICATIONS

Falconstor Software, Inc., "Service-Oriented Disaster Recovery RecoverTrac™ v2.0 Technical Whitepaper", 2011 (14 pages).
(Continued)

*Primary Examiner* — Bryce P Bonzo
*Assistant Examiner* — Jeison C Arcos
(74) *Attorney, Agent, or Firm* — Brandon N. Sklar

(57) ABSTRACT

Methods and systems for recovering a host image of a client machine to a recovery machine comprise comparing a profile of a client machine of a first type to be recovered to a profile of a recovery machine of a second type different from the first type, to which the client machine is to be recovered, by a first processing device. The first and second profiles each comprise at least one property of the first type of client machine and the second type of recovery machine, respectively. At least one property of a host image of the client machine is conformed to at least one corresponding property of the recovery machine. The conformed host image is provided to the recovery machine, via a network. The recovery machine is configured with at least one conformed property of the host image by a second processing device of the recovery machine.

29 Claims, 9 Drawing Sheets

Related U.S. Application Data

(60) Provisional application No. 61/655,308, filed on Jun. 4, 2012.

(51) Int. Cl.
  *G06F 11/20* (2006.01)
  *G06F 16/11* (2019.01)
(52) U.S. Cl.
  CPC .......... *G06F 11/1469* (2013.01); *G06F 11/20* (2013.01); *G06F 16/119* (2019.01); *G06F 11/2028* (2013.01); *G06F 11/2048* (2013.01); *G06F 2201/805* (2013.01); *G06F 2201/84* (2013.01)
(58) Field of Classification Search
  CPC ............. H04L 41/0806; H04L 41/0813; H04L 41/0823; H04L 41/082
  See application file for complete search history.

(56) References Cited

U.S. PATENT DOCUMENTS

| | | | | |
|---|---|---|---|---|
| 5,564,054 | A * | 10/1996 | Bramnick | G06F 9/4411 713/2 |
| 5,974,546 | A * | 10/1999 | Anderson | G06F 11/2284 713/2 |
| 6,266,162 | B1 | 7/2001 | Okamura | |
| 6,920,555 | B1 | 7/2005 | Peters et al. | |
| 7,020,697 | B1 | 3/2006 | Goodman et al. | |
| 7,155,585 | B2 | 12/2006 | Lam et al. | |
| 7,165,145 | B2 | 1/2007 | Lam | |
| 7,260,589 | B2 | 8/2007 | Cotner et al. | |
| 7,313,689 | B2 | 12/2007 | Falch et al. | |
| 7,356,679 | B1 | 4/2008 | Le et al. | |
| 7,506,037 | B1 * | 3/2009 | Ciano | G06F 9/4856 709/220 |
| 7,565,495 | B2 * | 7/2009 | Kleinschnitz, Jr. | G06F 8/63 711/154 |
| 7,565,517 | B1 * | 7/2009 | Arbon | G06F 8/63 709/220 |
| 8,103,747 | B2 | 1/2012 | Trujillo | |
| 8,156,251 | B1 | 4/2012 | Sorensen | |
| 8,266,473 | B2 | 9/2012 | Casale et al. | |
| 8,352,608 | B1 * | 1/2013 | Keagy | G06F 8/63 709/226 |
| 8,713,139 | B1 * | 4/2014 | Kasper | H04L 61/2038 709/221 |
| 9,031,130 | B2 | 5/2015 | Suzuki et al. | |
| 9,087,063 | B2 | 7/2015 | Wei et al. | |
| 2002/0016827 | A1 * | 2/2002 | McCabe | G06F 11/2058 709/213 |
| 2002/0049883 | A1 * | 4/2002 | Schneider | G06F 21/80 711/100 |
| 2002/0073354 | A1 * | 6/2002 | Schroiff | G06F 11/2023 714/4.11 |
| 2003/0051111 | A1 | 3/2003 | Nakano et al. | |
| 2003/0149750 | A1 * | 8/2003 | Franzenburg | G06F 3/0608 709/220 |
| 2004/0083355 | A1 * | 4/2004 | Smith | G06F 9/4416 713/1 |
| 2004/0172574 | A1 * | 9/2004 | Wing | G06F 11/2025 714/4.12 |
| 2004/0230788 | A1 * | 11/2004 | Zimmer | G06F 11/1441 713/2 |
| 2005/0091238 | A1 | 4/2005 | Zane et al. | |
| 2005/0149817 | A1 | 7/2005 | Biran et al. | |
| 2005/0216788 | A1 * | 9/2005 | Mani-Meitav | G06F 11/1456 714/6.32 |
| 2005/0246701 | A1 * | 11/2005 | Kanapathipillai | G06F 11/1433 717/168 |
| 2005/0268298 | A1 * | 12/2005 | Hunt | G06F 9/4856 718/1 |
| 2005/0283575 | A1 | 12/2005 | Kobayashi et al. | |
| 2006/0017970 | A1 | 1/2006 | Park et al. | |
| 2006/0089995 | A1 * | 4/2006 | Kerr | G06F 9/4856 709/227 |
| 2006/0095478 | A1 | 5/2006 | Cherkauer et al. | |
| 2006/0195715 | A1 * | 8/2006 | Herington | G06F 9/5077 714/4.2 |
| 2007/0168478 | A1 | 7/2007 | Crosbie | |
| 2007/0186127 | A1 | 8/2007 | Desai et al. | |
| 2007/0233953 | A1 * | 10/2007 | Shen | G06F 11/2038 711/114 |
| 2008/0034268 | A1 | 2/2008 | Dodd et al. | |
| 2008/0141015 | A1 | 6/2008 | Chalemin et al. | |
| 2009/0024502 | A1 | 1/2009 | Xie et al. | |
| 2009/0113126 | A1 | 4/2009 | Abels et al. | |
| 2009/0113171 | A1 * | 4/2009 | Herrell | G06F 15/17356 712/28 |
| 2009/0132683 | A1 * | 5/2009 | Furuyama | G06F 8/63 709/220 |
| 2009/0150528 | A1 * | 6/2009 | Tanabe | H04L 41/0806 709/221 |
| 2009/0210427 | A1 * | 8/2009 | Eidler | G06F 11/1484 |
| 2010/0091846 | A1 | 4/2010 | Suzuki et al. | |
| 2010/0250499 | A1 * | 9/2010 | McAlister | G06F 11/1451 707/679 |
| 2011/0182753 | A1 | 7/2011 | Taguchi | |
| 2011/0231839 | A1 * | 9/2011 | Bennett | G06F 9/45558 718/1 |
| 2012/0030669 | A1 * | 2/2012 | Tsirkin | G06F 9/45533 718/1 |
| 2012/0089578 | A1 | 4/2012 | Lam | |
| 2012/0151248 | A1 | 6/2012 | Bower et al. | |
| 2012/0151476 | A1 * | 6/2012 | Vincent | G06F 9/45558 718/1 |
| 2012/0221699 | A1 * | 8/2012 | Moriyasu | G06F 9/5077 709/223 |
| 2012/0284559 | A1 | 11/2012 | Akirav et al. | |
| 2012/0310890 | A1 | 12/2012 | Dodd et al. | |
| 2013/0268800 | A1 * | 10/2013 | Rangaiah | G06F 11/2033 714/4.11 |
| 2013/0326260 | A1 | 12/2013 | Wei et al. | |
| 2016/0065369 | A1 | 3/2016 | Kakutani | |
| 2016/0092308 | A1 | 3/2016 | Bates | |

OTHER PUBLICATIONS

International Search Report and Written Opinion dated Dec. 6, 2013 issued in the corresponding International Patent Application No. PCT/US13/44103.

Javaid, "How to Convert Physical Computer Into Virtual Machine (VMware, VirtualBox & Virtual PC)" Jan. 31, 2012, www.adiptivetips.com, pp. 1-14.

Dedoimedo, "Convert virtual machines with VMware Converter" Apr. 29, 2009, www.dedoimedo.com, pp. 1-9.

Hursay et al., Mar. 2007, The Design and Implementation of Checkpoint/Restart Process Fault Tolerance for Open MPI, Indiana Unv. (8 pages).

Office Action dated Mar. 27, 2015 issued in the corresponding to U.S. Appl. No. 13/909,746.

Office Action dated Oct. 8, 2015 which issued in the corresponding U.S. Appl. No. 14/796,632.

Notice of Allowance dated Feb. 12, 2016 corresponding to U.S. Appl. No. 14/796,632.

US Patent Application Publication No. 2015/0317215 corresponding to U.S. Appl. No. 14/796,632.

Notice of Allowance dated May 8, 2015 which issued in related U.S. Appl. No. 13/909,843.

Office Action dated Aug. 23, 2016 which issued in U.S. Appl. No. 15/176,800.

Extended Search Report dated Feb. 2, 2016 which issued in the corresponding European Patent Application No. 13800040.1.

Office Action dated Jun. 29, 2016 which issued in the corresponding Chinese Patent Application No. 201380037881.8.

Office Action dated Feb. 2, 2017 issued in the corresponding Taiwanese Patent Application No. 102119603.

(56) References Cited

OTHER PUBLICATIONS

Notice of Allowance dated Mar. 23, 2017 issued in the related U.S. Appl. No. 15/176,800.
Office Action dated Feb. 16, 2017 which issued in U.S. Appl. No. 13/909,746.
Extended Search Report dated Feb. 2, 2016 issued in corresponding European Patent Application No. 13800040.1.
Preliminary Report on Patentability dated Dec. 9, 2014 issued in the International Patent Application No. PCT/US2013/044103.
Office Action dated Jun. 13, 2016 issued in U.S. Appl. No. 13/909,746.
Office Action dated Jan. 12, 2016 issued in U.S. Appl. No. 13/909,746.
Notice of Allowance dated May 1, 2018 issued in U.S. Appl. No. 13/909,746.
Office Action dated Sep. 18, 2019 issued in U.S. Appl. No. 15/677,704.
Notice of Allowance dated Apr. 27, 2020 in U.S. Appl. No. 15/677,704.

* cited by examiner

AUTOMATED DISASTER RECOVERY SYSTEM AND METHOD

RELATED APPLICATION

The present application claims the benefit of U.S. patent application Ser. No. 13/909,746, which was filed on Jun. 4, 2013, which claims the benefit of U.S. Provisional Patent Application No. 61/655,308, which was filed on Jun. 4, 2012, both of which are assigned to the assignee of the present invention, and are incorporated by reference herein. The present application is related to U.S. patent application Ser. No. 13/909,843, which was filed on Jun. 4, 2013, issued on Jul. 21, 2015 bearing U.S. Pat. No. 9,087,063 B2, and is assigned to the assignee of the present application.

FIELD OF THE INVENTION

Data recovery and, more particularly, automated data recovery from any type of client machine to any type of recovery machine, and failover back to any type of client machine.

BACKGROUND OF THE INVENTION

Ensuring smooth recovery of operations after downtime due to data loss or corruption, equipment failure, or complete site outage after a power loss, a natural disaster, such as an earthquake, a flood, a hurricane, or a tornado, for example, or a man-made problem, such as a spill of hazardous material, infrastructure failure, or sabotage, for example, is a significant challenge to data centers. Resuming operation at a data disaster recovery site, whether planned (such as a scheduled site migration) or unplanned (such as an accidental event), requires careful preparation. Planning for such contingencies could take months, while the execution of the plan may need to take place in minutes. Dozens or hundreds of steps need to be performed by the application, hardware, network, and storage teams. Any error, process flaw, routing issue, or other factors could delay the site recover.

To separate the site from the same risks posed to the client system, the remote disaster recovery site may be separated from the client system by many miles. The disaster recovery site may be in a different part of a city, a different city, a different state, a different country, or even a different continent than the client system, depending upon the risks to the client system and the budget of the client system, for example. This lessens the risk that a power failure, natural disaster, or man-made problem at the client system is also affecting the disaster recovery site.

The servers, desktop computers, laptop computers, and workstations at a client are referred to as client machines, while the servers, desktop computers, laptop computers, and workstations at a data recovery site are referred to as recovery machines. Client machines and recovery machines may be physical or virtual. The data images and unpersonalized operating system ("OS") installed on disks of machines before purchase are referred to as an OS Image. The OS Image is personalized and turned into a host image for that machine, on startup. Applications may then be installed, data may be created, and the machine further customized. After the machine is configured and used, the OS and Data Images stored on a hard drive of a machine are referred to as a host image. In disaster recovery, a backed up copy of the host image is typically recovered to a recovery machine so that the host image may run on the recovery machine.

The known commercially available disaster recovery solutions have limitations. Some known commercially available conversion processes require a pre-configured destination machine or machines with the same hardware and/or operating system ("OS") as the client machine, which adds significant cost and is slow. Others require that software be written to handle recovery to a predetermined type of recovery machine.

Site Recovery Manager, available from VMware, Inc., Palo Alto, Calif., for example, only enables recovery of applications running in virtual machines hosted on VMware ESX server by hypervisor. It is not possible to move a host image running on a failed physical machine to a virtual recovery machine and back to the physical machine or to another physical machine during failback from the disaster recovery data center back to the client system. Citrix Systems, Inc., Fort Lauderdale, Fla., has a similar product with similar limitations.

Windows® Server 2008 R2 Failover Clustering, an adaptation of Microsoft Cluster Service (MSCS), available from Microsoft Corporation, Redmond, Wash., allows supported applications to be clustered. This is a high availability solution that requires the cluster machines at the disaster recovery site to be up and running 24/7, in anticipation of a disaster. This can be quite expensive. The active cluster machines at the disaster recovery site require power, licensing, and maintenance.

RecoverTrac 2.0, available from FalconStor, Inc., Melville, N.Y., enables automatic recovery from a physical client machine to a physical recovery machine (physical-to-physical ("P2P") recovery), as long as the two physical machines are of the same type (same type of hardware, same manufacture, and same operating system). RecoverTrac 2.0 also enables automatic recovery from a virtual client machine to a virtual recovery machine (virtual-to-virtual ("V2V") recovery), and from a physical client machine to a virtual recovery machine (physical-to-virtual ("P2V") recovery), for any certified hypervisor or physical platform, as long as the type of the client machine and the type of the recovery machine are known to the recovery system. In this case, conversions required to a host image or a recovery machine, including the replacement of storage drivers and the setting of IP addresses, as necessary, are hard coded in the software controlling the recovery process. The software is written based on the type of the client machine and the recovery machine, and their operating systems. Recovery jobs include local data recovery, such as bare metal recovery jobs, as well as remote data recovery, with both site failover and site failback orchestration.

In many instances, client machines are old and the same model of hardware is no longer commercially available. The client machines to be recovered are not always known to a disaster recovery site and the recovery machines are not always known to the client system prior to a disaster.

SUMMARY OF THE INVENTION

In accordance with an embodiment of the invention, a method of recovering a host image of a client machine to a recovery machine is disclosed comprising comparing a first profile of a client machine of the first type to be recovered to a second profile of a recovery machine of the second type different from the first type, to which the client machine is to be recovered, by a first processing device. The first and second profiles each comprise at least one property of the first type of client machine and the second type of recovery machine, respectively. At least one property of a host image of the client machine is conformed to at least one corresponding property of the recovery machine based, at least in part, on the comparison, by the first processing device. The host image includes an operating system. The conformed host image is provided to the recovery machine, via a network, and the recovery machine is configured with at least one conformed property of the host image by a second processing device of the recovery machine. The second processing device is different from the first processing device.

In one example of an embodiment of the invention, a method of recovering a host image of a client machine of a first type to a recovery machine of a second type different from the first type is disclosed comprising, collecting and storing profile information for at least one client machine and at least one recovery machine, and comparing a first profile for a client machine of a first type to be recovered to a second profile of a recovery machine of a second, different type, to which the client machine is to be recovered. The method further comprises conforming properties of a host image of the client machine to the properties of the recovery machine based on the comparison, providing the conformed host image to the recovery machine, configuring the recovery machine based on the conformed properties of the host image during a first, limited boot up, and rebooting the recovery machine in a second, normal mode boot up.

The limited boot up may be a safe mode boot up. In some cases, the limited boot is followed by a normal boot, after which the recovery machine may operate as if it were the client machine. In other cases, two limited boot ups are required. A first limited boot up, such as a Windows® mini set up, may be provided to replace the hardware abstraction layer ("HAL") of the recovery machine, and a second limited boot, such as a safe mode boot, may be provided to configure other aspects of the recovery machine. In this case, normal mode boot up may follow the second limited boot up.

The properties of the host image that may be conformed to the properties of the recovery machine may include the network storage drivers, the storage adapter drivers, and/or the partition style, for example. The conforming process may be performed by a processing device separate from the recovery machine. Additional information required for the operation of the host image on the recovery machine may be provided in a job file. Such information may include configurable information, such as network settings, service settings, geometry settings, and conversion policies, for example. The host image may contain an operating system and the recovery machine may be configured by the operating system on the host image, at least in part during the limited or safe mode boot up. The profiles of the client machines and the recovery machines may be profiles of representative client and recovery machines, for example.

The host images may be stored on SAN devices, which may be local backup storage devices of a client system for backing up client machines, and/or remote backup storage devices at disaster recovery systems, which backup the local backup storage devices, for example. Backup of client machines to local backup storage devices, backup of local backup storage devices to remote backup storage devices, and recovery of host images of client machines to recovery machines may take place across one or more networks, the Internet, a wide area network ("WAN"), a local area network ("LAN"), a fibre channel storage area network ("SAN"), an Ethernet, and/or an Internet small computer systems interface ("iSCSI"), for example. In one example, backup of client machines to local backup storage devices may take place across a first network of the client system, such as a SAN, while backup of the local backup storage devices to remote backup storage devices may take place across a WAN. Recovery of host images from client machines and back up from a remote backup storage device to a recovery machine, may take place across a SAN in the disaster recovery system. Recovery to local recovery machines may also be provided, if the local recovery machines are still operational. Failback to the client machines from the recovery machines may also be provided in accordance with embodiments of the invention.

In accordance with another embodiment of the invention, a system for recovering a host image of a client machine to a recovery machine is disclosed comprising a first processing device, at least one recovery machine comprising a second processing device different from the first processing device, and storage associated with the first processing device. The storage stores first profile information for a first plurality of types of client machines including a first type of client machine and second profile information for a second plurality of types of recovery machines including a second type of recovery machine different from the first type of client machine. The profile information comprises at least one property of each of the first plurality of types of client machines and each of the second plurality of types of recovery machine, respectively. The first processing device is configured to compare a first profile of a client machine of a first type to be recovered to a second profile of a recovery machine of a second type to which the host image is to be recovered. The first processing device is further configured to conform at least one property of a host image of the client machine to at least one corresponding property of the recovery machine based, at least in part on the comparison, and to cause transfer of the conformed host image to the recovery machine, via a network. The second processing device is configured to configure the recovery machine with at least one conformed property of the host image.

In accordance with another embodiment of the invention, a disaster recovery system is disclosed comprising a recovery manager comprising a processing device, such as a central processing unit or microprocessor, for example, a backup storage device to backup a client system, and recovery machines, each coupled to a network. The recovery manager stores profiles of representative client and recovery machines. The processing device compares the profiles of the client machine and a recovery machine to which the client machine will be recovered to, and conforms at least certain properties of a host image from the client machines to a respective recovery machine based, at least in part on the comparison. The processing device also injects a program into respective host images that runs during boot up on a respective recovery machine, to configure the recovery machine with the conformed properties of the host image. Configuration can take place during a limited, safe mode boot up of the recovery machine, which may be followed by a normal mode boot up. A second limited boot may be required prior to the first limited boot up to effectuate certain configuration changes, such as changing the hardware abstraction layer ("HAL") of the recovery machine to the HAL of the client machine and host image. To conform the host image to properties of the recovery machine, network storage drivers, storage adapter drivers, and/or the partition style, of the host image may be conformed to that of the recovery machine, for example.

In accordance with another embodiment of the invention, a recovery manager as described above is provided in a client system, to recover client machines to local recovery machines across a network, in a similar manner as described above with respect to recovery to a disaster recovery system. In accordance with another embodiment of the invention, failback to client machines or local recovery machines at a client system is conducted by a recovery manager in a disaster recovery system or in a client system, in a similar manner as described above with respect to recovery to the disaster recovery system.

DESCRIPTION OF A PREFERRED EMBODIMENTS

In accordance with embodiments of the invention, systems and methods are provided for the automatic, bare metal recovery of physical-to-physical ("P2P"), virtual-to-virtual ("V2V"), virtual-to-physical ("V2P"), and physical-to-virtual ("P2V"), client machines to recovery machines, respectively, where the type of the recovery machine and the type of the client machine may be different and may not be known to each other or to respective client and recovery systems. As used herein, the term "type" means type of hardware and/or type of manufacturer. The type of hardware may include servers, desktop computers, laptop computers, and/or work stations, while the type of manufacture may include Dell, Inc., Round Rock, Tex. ("Dell"), Hewlett Packard Company, Palo Alto, Calif. ("HP"), Lenovo, Morrisville, N.C. ("Lenovo"), etc. For example, a Dell client server suffering a shutdown due to a power failure may be recovered to an HP recovery server, and the HP recovery server may be failed back to the same or another Dell server when the server or the client system becomes operational again. In another example, a plurality of Lenovo laptops may be recovered to a virtual machine running within a hypervisor on a Dell server, and may be failed back to Lenovo or other laptops. Recovery to a different type of machine than the client machine, where the type of client machine and recovery machine is not predetermined, is enabled in accordance with embodiments of the invention by comparing profiles of each machine and modifying a backed up copy of the client machine, referred to as a host image, and/or the recovery machine, so that a host image of a client machine can run on the recovery machine.

Figure 1:
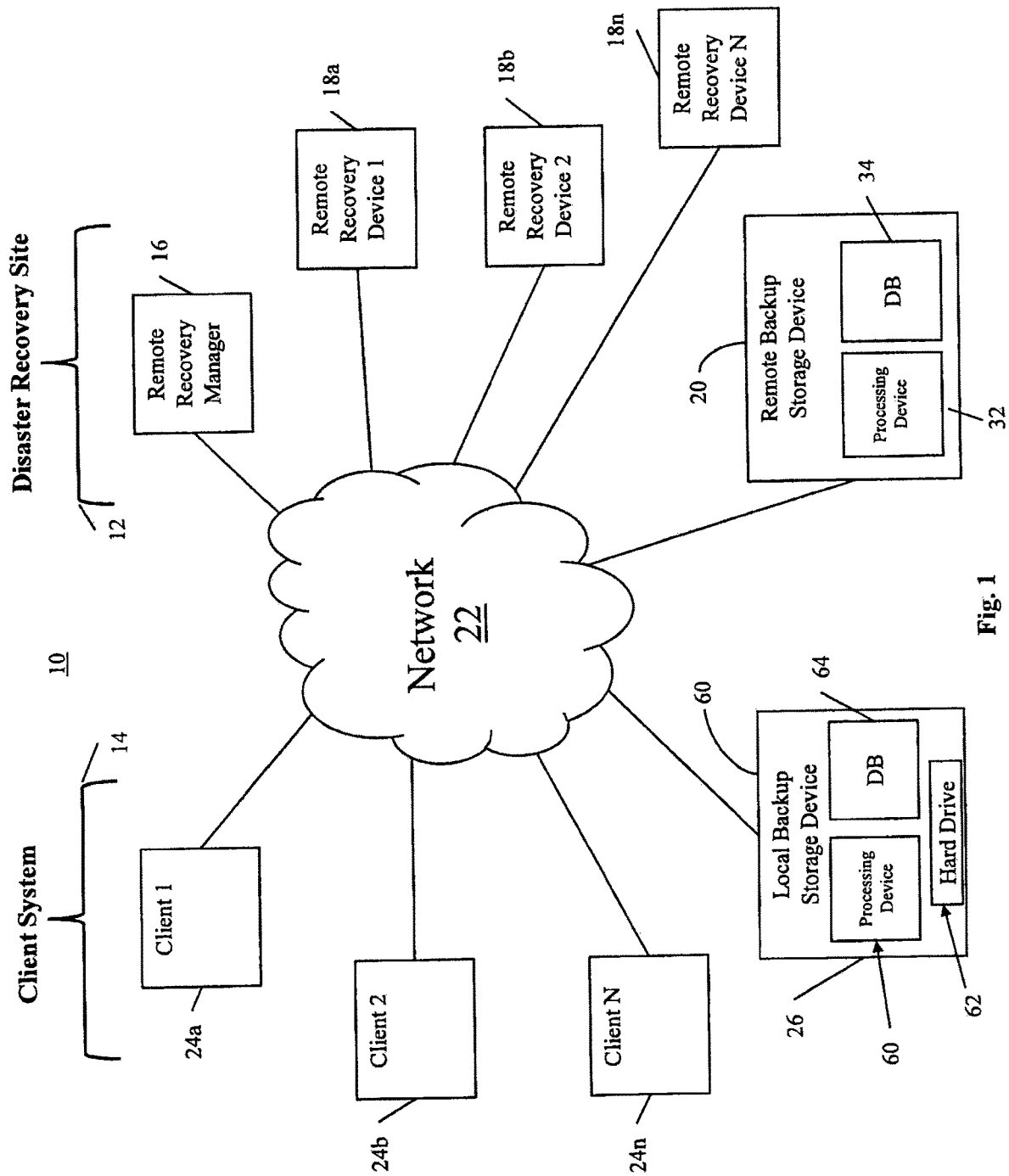
FIG. 1 is a block diagram of an example of a disaster recovery environment including a disaster recovery system and a client system protected by the disaster recovery system, in accordance with an embodiment of the invention.

FIG. 1 is a block diagram of an example of a disaster recovery environment 10 including a disaster recovery system 12 and a client system 14 protected by the disaster recovery system, in accordance with an embodiment of the invention. The disaster recovery system 12 comprises a remote recovery manager 16, one or more remote recovery devices or machines 18a, 18b ... 18n, and a remote backup device 20, each of which are coupled to a network 22. The client system 14 in this example comprises one or more client machines 24a, 24b ... 24n and a local backup storage device 26, each of which is coupled to the network 22. One or more local recovery machines (not shown) may also be coupled to the network as well, for local recovery of the client system. Local recovery is discussed further below.

The network 22 may comprise any one or several different types of networks. Communications over the network may take place by means of IP protocols or fibre channel protocols, for example. The network may be an intranet, the Internet, a wide area network ("WAN"), a local area network ("LAN"), such as an Ethernet, a fibre channel storage area network ("SAN"), or an Internet small computer systems interface ("iSCSI"), for example.

The remote recovery manager 16 comprises one or more processing devices 28, such as a central processing unit or microprocessor, for example. The remote recovery manager 16 also includes at least one hard drive 30. Other memory 31, such as ROM and/or RAM, may also be provided. The recovery manager may be a server or computer, for example. The remote recovery manager 16 may alternatively be in other locations of the system, such as part of the remote backup storage device 20, in which case, the processing device 42 on the remote backup storage device may be configured to perform the functions of the recovery manager. The recovery manager 16 is configured to implement aspects of embodiments of the present invention under the control of a software engine 30a on the hard drive 30 or in other storage run by the processing device 28, for example. The recovery manager 16 may also be configured in whole or in part to implement aspects of embodiments of the invention by hardware, such as an ASIC, or by a combination of hardware and software.

The remote backup storage device 20 periodically backs up the local backup storage device 26 in manners known in the art, such as by using replication and a snapshot marker, for example. An example of replication is described in U.S. Pat. No. 7,155,585, which is assigned to the assignee of the present invention and is incorporated by reference herein. An example of the use of a snapshot marker is described in U.S. Pat. No. 7,165,145, for example, which is also assigned to the assignee of the present invention and is incorporated by reference herein. IPStor®, available from FalconStor, Inc., Melville N.Y., which incorporates aspects of U.S. Pat. Nos. 7,165,145 and 7,155,585, may be used, for example. Data deduplication may be performed, as well, as described in U.S. Patent Publication No. US 2012/0089578 A1, for example, which was filed on Aug. 21, 2011, is assigned to the assignee of the present invention and is incorporated by reference herein, for example.

Returning to FIG. 1, the remote backup storage device 20 may comprise one or more servers or computers, each comprising a processing device 32, such as a central processing unit or microprocessor, and at least one storage device 34 that may define a database DB, for example, as shown in FIG. 1. Other memory is typically provided as well, such as ROM and/or RAM (not shown). The remote backup storage device 20 may provide physical and/or virtual memory storage. Backup from the local backup device 20 to the remote backup device may take place periodically or continuously, depending on the desires of the client system 14 and the capabilities of the remote backup storage device 20, for example.

For each client machine 24a, 24b . . . 24n in the client system 14, there is typically a corresponding respective remote recovery machine 18a, 18b . . . 18n in the disaster recovery system 12, although that is not required. The remote recovery machines 18a, 18b . . . 18n may comprise remote physical or virtual machines, computers, laptop computers and/or work stations, for example. A hypervisor server may run on multiple virtual recovery machines for multiple client machines. Remote virtual machines may be created as needed for disaster recovery, and removed when no longer needed, so that the disaster recovery system 12 does not have to pre-allocate or create them ahead of time.

Figure 3:
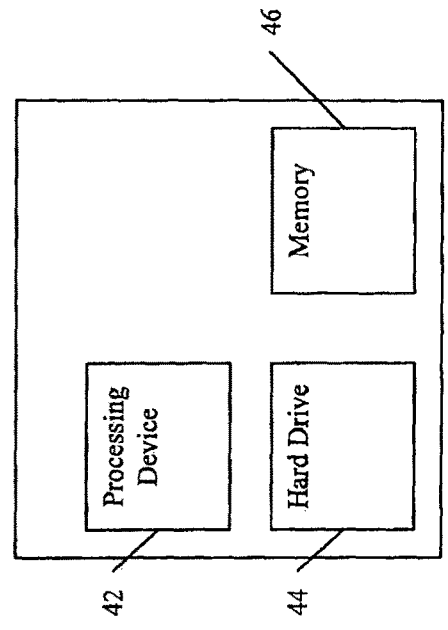
FIG. 3 is a block diagram of an example of a recovery machine, in the embodiment of FIG. 1.

The remote recovery machines 18a, 18b . . . 18n each comprise a processing unit 42, such as a central processing unit or microprocessor, for example, a hard drive 44, and additional memory 46, such as ROM and/or RAM, as shown in FIG. 3. The remote recovery machines may be virtual machines defined on a server, for example, as discussed above. In accordance with embodiments of the invention, the remote recovery machines may or may not be the same type of hardware as the respective client machine, may be from a different manufacturer, and are not preconfigured to receive a host image from a specific client machine or type of client machine.

Figure 4:
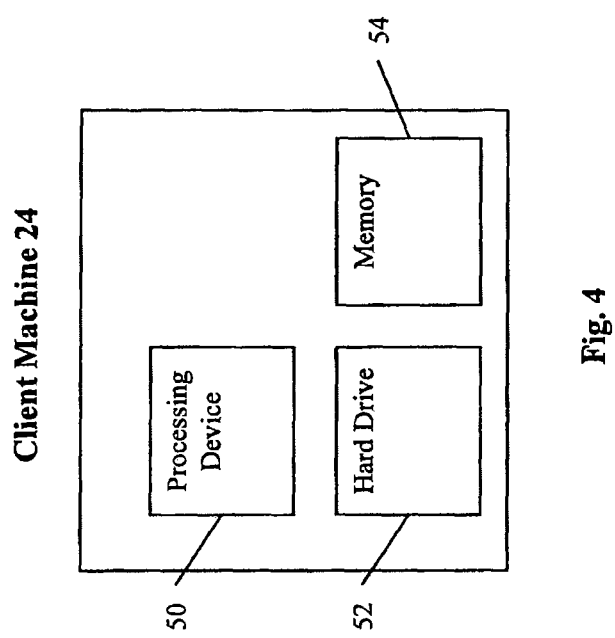
FIG. 4 is a block diagram of an example of a client machine, in the embodiment of FIG. 1.

Returning to FIG. 1, the client machines 24a, 24b . . . 24n in the client system 14 each comprise a processing device 50, such as a central processing unit or microprocessor, for example, a hard drive 54, and memory, such as ROM and/or RAM, as shown in FIG. 4. The client system 14 may comprise physical and/or virtual client machines 24a, 24b . . . 24n, such as physical and/or virtual servers, desktop computers, laptop computers and/or workstations, for example.

Client machines 24a, 24b . . . 24n are regularly backed up to the local backup storage device 26, in manners known in the art, such as by replication and use of a snapshot marker, for example, as discussed above. IPStor® may be used, for example, and data deduplication may also be provided, as is also discussed above. The local backup storage device 26 comprises a processing device 60, such as a central processing unit or microprocessor, one or more hard drives 62, and a storage device 64, which may be a database ("DB"), for example. In particular, the backup storage device 26 backs up copies of the hard drives of the client machines 24a, 24b . . . 24n, referred to as host images, as described above, in the database 64, for example, via the network 22. The storage device 64 may provide physical and/or virtual memory storage. The local backup storage device 26 provides backed up host images to the remote backup storage device 20 via the network 22 periodically or continuously during backup procedures defined by the client system 14, depending on the desires of the client system 14 and the capabilities of the remote backup storage device 20, for example, as discussed above.

To describe a server or desktop computer protected in accordance with embodiments of the invention, the type of machine, including the manufacturer of the machine (Dell, HP, Lenovo, etc.), the hardware (desktop, laptop, server, etc.), and the host image need to be described. For example, an IBM System x3650 server running Windows® 2008 with applications such as SQL Server 2008 would be identified as an "IBM System x3560" machine running a host image including Windows® 2008, the applications, and the data.

Client and recovery machines of different types and in different locations may have different network settings and addresses. Client and recovery machines of different types may also have different drivers, such as different storage drivers, different interface card drivers, and different system drivers, such as different USB drivers and power controllers, for example. Client and recovery machines of different types may also have different adapters, such as storage adapters, IDE adapters, network adapters, display adapters, host bus adapters ("HBA") and/or video adapters, for example. They may also have different hardware abstraction layers ("HAL") and/or SAN architectures. These differences may prevent the host image from a client machine of one type from running on the recovery machine of another type, or prevent the recovery machine from performing all the desired functions of the respective client machine.

In order to recover a respective client machine, such as the client machine 24b, to a remote recovery machine, such as remote recovery machine 18b, which is different from client machine 24b, in accordance with embodiments of the invention, the host image of the client machine 24b is configured to run on the remote recovery machine 24b. For example, if the adapters on a respective client machine are different than those on the recovery machine to which the host image is to be recovered, then compatible drivers need to be provided on the host image in order for the host image to boot and operate on the recovery machine. Certain conversions are performed on the respective host image and other conversions are performed on the recovery machine, upon boot up. In order for the host image to be converted, it must be a writeable host image. For example, network settings for the recovery machine, which are provided to the host image, are loaded on the recovery machine during boot up. If the host images stored on the local or remote backup storage devices 26, 32 are not writeable, then a writeable copy of the host images is prepared for conversion.

The properties of the client machines 24a, 24b . . . 24n and recovery machines 18a, 18b . . . 18n may be stored by the remote recovery manager 16 and compared during the recovery process, to determine the changes that are necessary to the host image to enable it to run the recovery machine. The respective characteristics may be stored in respective profiles, each referred to as a machine hardware profile ("MHP"), which is stored by the recovery manager and listed in a directory of the hard drive 30, for example.

Figure 5:
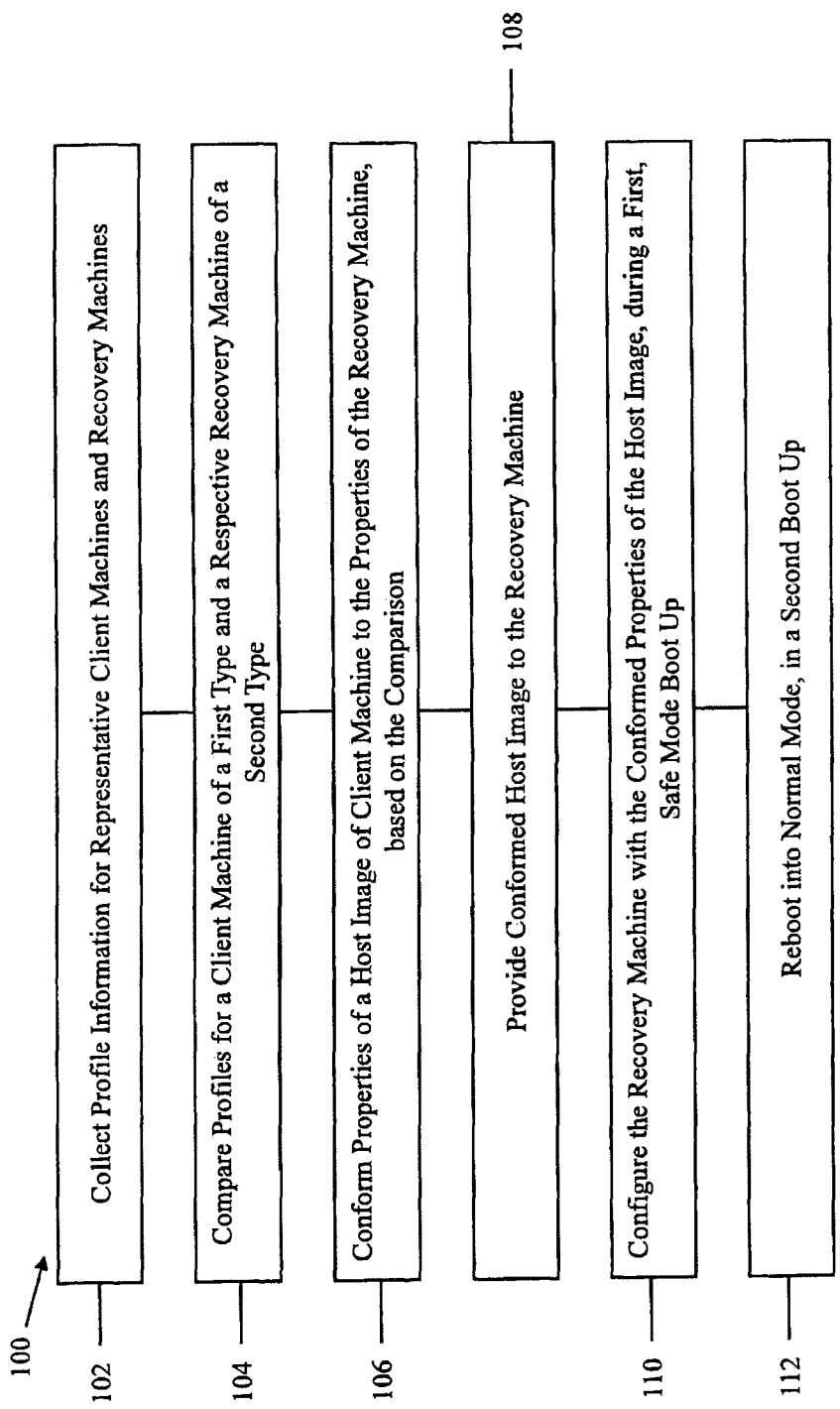
FIG. 5 is a flowchart of an example of a method of recovering a host image of a client machine to a recovery machine during disaster recovery, in accordance with an embodiment of the invention.

FIG. 5 is an example of a flowchart of a method 100 of recovering a host image of a client machine to a recovery machine during disaster recovery, in accordance with an embodiment of the invention. Profile information for representative client machines and recovery machines is collected, in Step 102, prior to a disaster taking place. The profiles may be stored in the remote recovery manager 16, for example. When recovery is required, the profiles for a client machine of a first type to a recovery machine of a second, different type, are compared, in Step 104. Properties of a host image of the client machine are conformed to the properties of the recovery machine based on the comparison, in Step 106.

The conformed host image is provided to the recovery machine, in Step 108. The recovery machine is then configured based on the conformed properties of the host image during a first, limited boot up, such as a safe mode boot up, in Step 110. The recovery machine is then rebooted in a second boot up, in normal mode. After the normal mode boot up, the recovery machine may operate as if it were the client machine.

An MHP is generated for at least every OS/hardware combination of the client machines 24a, 24b . . . 24n in the client system 14 and every OS/hardware combination of the remote recovery machines 18a, 18b . . . 18n in the disaster recovery site 12. For example, if a client has 200 client machines of two different hardware types (Dell and Lenovo, for example), each of which run one of two different operating systems, it would be necessary to run the MHP on four representative client machines, each having a different combination of hardware and OS. The same applies to the remote recovery machines 18a, 18b . . . 18n.

Prior to the recovery, the recovery machines 18a, 18b . . . 18n do not have an operating system. In order for the host image to run on the recovery machine, the operating system on the host image, which is the operating system of the client machine 24b, must be able to launch on the recovery machine 18b. The storage drivers on a host image must therefore be the proper drivers for the respective recovery machine on which the host image will be recovered, in this example recovery machine 18b. For example, if the hard drive 44 on the remote recovery machine 24b is an integrated disk electronics ("IDE") disk, the host image machine needs an IDE driver. If the hard drive 44 is a small computer system interface ("SCSI") disk from a particular manufacturer, the host image needs the SCSI drivers from that manufacturer. The storage drivers required for respective recovery machines are identified in the MHP.

In order for the remote recovery machine to communicate with the network 22 and seamlessly take the place of the client machine 24b in functionality (to receive data directed to the client machine 24b, for example), the network settings of the host image, based on the client machine 24b, need to be conformed to that of the recovery system 12. The name of the client machine 24b, however, is preserved so that data being sent to the client machine 24b will be received by the recovery machine 18b. If the IP address is changed, it will typically be mapped to the recovery machine 24b by a domain name system ("DNS") server at the recovery site 12. The IP address may need to be changed in order to successfully recover to the disaster recovery system 12, unless the disaster recovery system 12 uses the same IP address subnet as the client system 14.

It would be advantageous to conform other drivers, adapters, and settings of the host image to that of the recovery machine, as well, for further functionality of the host image on the recovery machine, such as video adapters, which could provide higher screen resolution, and power control drivers, which can provide remote power control capability, such as intelligent platform management interface ("IPMI"), integrated lights out ("iLO") and/or lights out management ("LOM"), for example.

In one embodiment of the invention, to conform the host image, at least in part, to the environment of the recovery machine 18b, so that the host image can run on the recovery machine, the remote recovery manager 16 compares the MHPs of respective client and recovery machines, mounts the backup storage device storing the host image (either the remote backup storage device or the local backup storage device), and replaces the storage drivers on the host image by the storage drivers on the recovery machine, if necessary, via a software conversion engine 30a, referred to as RT Convert, which is stored on the hard drive 30 of the remote recovery machine and run by the processing device 28 of the recovery manager 16. The storage drivers of the recovery machine may be stored in the MHP for the respective recovery machine, for example, and retrieved if necessary. Additional information required for the operation of the host image on the recovery machine may be provided in a job file. Such information may include configurable information, such as network settings, service settings, geometry settings, and conversion policies, for example. Similarly, RT Convert 30a changes the network settings of the host image based on network settings of the remote recovery machine 24b found in the MHP for the recovery machine, or in the job file. Other characteristics of the host images may be changed, as well, based on the comparison of the respective MHPs.

The MHPs may be collected by a software utility. In one example, the MHPs for the client machines 24a, 24b . . . 24n are collected by the client system 14, which runs the utilities prior to a disaster taking place. The MHP software utility may be downloaded to the client system 14 by the disaster recovery site 12, via the network 22, across the network. The client system may install the MHP software utility on the hard drive 62 of the local backup storage device 26, or the utility may be placed there by the remote recovery manager 16 via a network share across the network 22, for example. The MHP software utility may also be a part of the backup software run by the local backup storage device 26. The processing device 60 of the local backup storage device 26 may run the MHP utility on all or certain of the client machines 24a, 24b . . . 24n, via a network share, for example. The profiles generated by the MHP utilities may be collected by the local storage device 26, stored on the local backup storage device 16, on the hard drive 62, the storage device 64, or other storage (not shown), and may then be sent to the remote recovery manager 16 across the network 22, via a network share or SAN, for example.

The MHP utility may also be run by the remote recovery manager 16 on the client machines, via a network share with the client machines. The utility may be run by a respective processing device when a recovery job is first set up, and then whenever a new hardware/OS combination is introduced to the client system 14 or data recovery system 12, for example. It may also be run on the host images of the client machines 24a, 24b . . . 24n whenever host images are backed up, for example.

The recovery manager 16 may store the respective MHPs in an MHP directory, with an identification of the respective client machine type, on the hard drive 30, for example. In one example, each MHP is stored in a different sub-directory of the MHP directory.

Since the recovery machines 18a, 18b . . . 18n are off and do not include an operating system, in order to collect MHPs for the remote recovery machines 18a, 18b . . . 18n that are of different hardware/OS configuration than any profiles for the recovery machines that have already been collected, the recovery machines must be booted up with the same OS as the respective client machine to be recovered to it. This may be done manually by an operator at the recovery site 12 or by the remote recovery manager 16, which may boot up the remote recovery machines 18a, 18b . . . 18n, provide a temporary operating system of the same type as the respective client machine to be recovered, and then run the MHP utility on some or all of the remote recovery machines, as needed. As above, in one example, the MHPs of the remote recovery machines 18a, 18b . . . 18n are stored in a directory of the remote recovery manager 16, which then removes the operating system and shuts down the recovery machines. The MHPs of the recovery machines 18a, 18b . . . 18n may be stored in the same directory storing the MHPs of the client machines 24a, 24b . . . 24n, a related directory, or a different directory, for example.

The MHP utilities collect the hardware device identification (Dell, Lenovo, etc.), the OS type, the driver information, the adapter information, and HAL information, for the client machine and the recovery machines by examining the appropriate directories on the respective machines. For example, the driver information is typically included in a Windows® system driver directory, such as CAWindows\System32\drivers, for example. The actual drivers and adapters may be included in the MHPs, as well.

In one example, the collected MHPs are placed into one or more XML files, for example, by the processing device 60 under the control of the MHP utility, in the local backup storage device 26. The XML file and the drivers may be placed into a cabinet ("CAB") file, for example, by the utility, for ease of transport to the remote recovery manager 16 across the network 22. The CAB file may contain several XML files and drivers for multiple OS/hardware combinations. A plurality of MHPs for individual OS/hardware combinations may be combined to form a larger profile to define the specification for many OSs on one hardware model. The CAB file or files for the client system 14 are provided to the remote recovery manager 16 by the local backup storage device, via a network share, or they may appear on the remote recovery manager as a virtual file via a SAN, for example. The remote recovery manager 16 removes the XML file or files and the drivers from the CAB file, and stores them in respective sub-directories, as described above, for example.

The processing device 28 of the recovery manager 16, under the control of the MHP utility or manually, may similarly create the XML files and place the XML files and drivers into the directory. The directory or sub-directories of the MHPs for the client system 14 and the disaster recovery system 12 may be shared so that MHPs are centralized and the host images for many client machines may be converted by the same or multiple conversion engines or one or more recovery managers 16.

Figure 6:
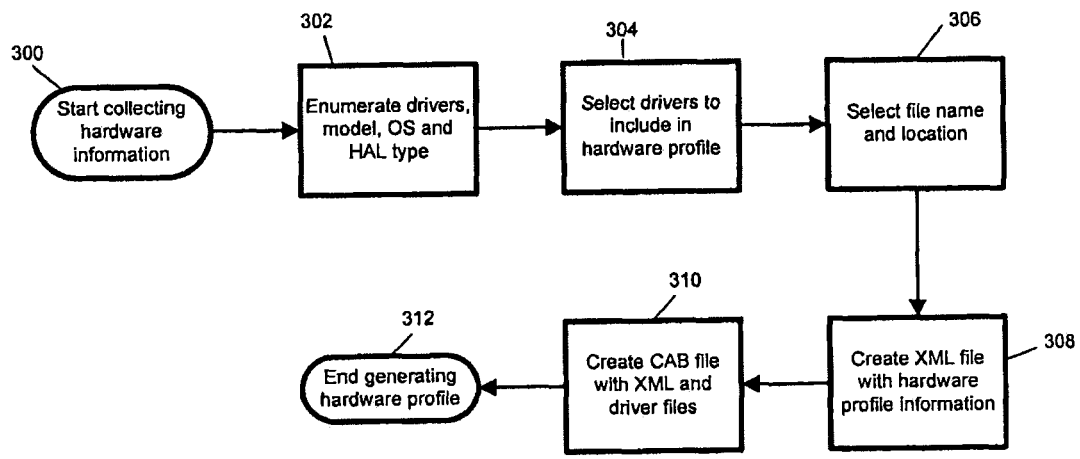
FIG. 6 is a flowchart of an example of a method of creating a machine hardware profile of a client machine or a recovery machine, in accordance with an embodiment of the invention.

FIG. 6 is a flowchart of an example of a method 300 of creating an MHP for the client machines 24a, 24b . . . 24n and/or recovery machines 18a, 18b . . . 18n, as needed, in accordance with an embodiment of the invention, by a respective processing device under the control of a utility. The utility may be run by the processing device 60 of the local backup device 26, the processing devices 50 of the respective client machines, or the processing device 28 of the remote recovery manager 16, in accordance with one embodiment of the invention, to create MHPs for client machines 24a, 24b . . . 24n. The utility may be run by the processing device 28 of the remote recovery manager, a processing device 42 of a respective recovery machine, or the processing device 32 of the remote backup device 20, to create MHPs for respective recovery machines and recovery machines 18a, 18b . . . 18u.

The utility starts to collect hardware information concerning a client machine, in Step 302. Drivers, hardware, model, OS, and HAL type are enumerated from the operating system of the respective client machine, in Step 304. All drivers for the devices in the XML are selected, in Step 306. A file name and location are selected for a CAB file that will contain the respective XML file or files, in Step 308. An XML file including the hardware profile information is created, in Step 310. The CAB file including the XML file and the driver files is created, in Step 312. The utility ends, in Step 314. The CAB file is placed in the network share of the local backup storage device 26, for example, and imported by the remote recovery manager 26 from the network share or SAN. The utility run by the processing device 28 of the remote recovery manager 16 to create profiles for the recovery machines operates in a similar manner, except that it is not necessary to create CAB files, although that is an option. As noted above, the utility may be run on all client machines and recovery machines, or only representative machines.

A recovery procedure starts when the disaster recovery site is informed by the client system 14 to run a predetermined job, which may be a run in a test mode or an actual disaster recovery mode, for example. The parameters of a job may be defined in a job file by the client system 14 so that the job file will be available to run the test or recovery prior to the event. In one example, the job file is an XML file, which is stored by the remote recovery manager 16 in a job directory. The job file may define the particular settings to be changed on the host image in order for the host image to operate on the respective recovery machines 18a, 18b . . . 18c that the respective client machines 24a, 24b . . . 24c are to be recovered to, such as the network settings to be enabled and disabled, power control management, whether a particular machine is an active directory ("AD") server, and/or the AD recovery policy, for example. The job file may include the network settings, such as the IP address, network mask, gateway address, DNS address, and/or Windows® Internet Name Service ("WINS") address for recovery machine. The network settings may be in the MHP of the respective recovery machines, instead or in addition to being in the job file.

In an actual disaster, the client system 14 instructs the disaster recovery system 12 to run a disaster recovery job to recover all or some of the client machines 24a, 24b . . . 24n. The client system 15 may inform the disaster recovery system 12 that recovery of the local backup storage device 26 is required, as well. The disaster recovery site 12 may also automatically monitor the client machines 24a, 24b . . . 24n or the client system 14 via a heartbeat, or other methods, for example. A path to the directory containing the MHPs is then provided to an RT Convert conversion engine 30a run by the processing device 28 of the remote recovery manager 16, which accesses the appropriate job file and the MHPs in the respective sub-directories.

In one example the remote recovery manager 16 mounts a network share of the remote backup storage device 20 via the network 22, and runs the RT Convert conversion engine 70 on the current host images backed up to the remote backup device. If the remote backup storage device 20 is a SAN storage device, the host image may be presented to the remote recovery manager 16 as one or a plurality of virtual disks, which are mounted by the recovery manager 16. The remote recovery manager 16 may instead be configured to mount the local backup storage device 26 across the network 22, if it is still functioning. The local backup storage device 26 may have more current host images than the remote backup storage appliance, depending on how frequently the host images are backed up from the local backup storage device to the remote backup storage device, and when in relation to the last backup the disaster took place. Alternatively, if the local backup storage device 26 is still functioning, it may provide the most current host images to the remote backup storage device 20, upon the request of the remote recovery manager 16 or the remote backup storage device, for use by the remote recovery manager.

To conform each host image for each client machine 24a, 24b . . . 24n that needs to be recovered to a respective recovery machine 18a, 18b . . . 18n, the RT Convert engine 30a performs one or more of the following operations on each host image to be recovered in accordance with embodiments of the present invention: configure Windows® services start up settings; inject the network configuration; preload storage adapter drivers for OS boot up on the respective recovery machine; prepare the drivers for boot up on the respective recovery machine; fix the geometry of boot disk, which contains the operating system on the host image, if necessary; change the partition style, if necessary; enable authoritative ("AD") or non-authoritative recovery; determine whether the HAL of the recovery machine needs to be changed; and enable safe mode boot up on the respective recovery machines, for example. The changes may be made directly to the host image, or a separate host image may be created including the changes with respect to the original host image. In that case, both the original host image and the changed host image would be provided to the respective recovery machine. The changes are based on a comparison of the MHPs for the client machine and respective recovery machine, or MHPs of representative client machines and recovery machines, as well as the information in the job file.

RT Convert also injects into the host image a program that will run on the respective recovery machines during boot up of the recovery machines 18a, 18b . . . 18n, to complete the recovery process. This program, referred to as RT Rehome, performs the remaining conversions that must be done to the recovery machines 18a, 18b . . . 18n during boot up in order for the respective host image to run on them, and then reboots the recovery machine in a normal mode.

After the RT Convert process is completed, each host image is assigned to a respective recovery machine 18a, 18b . . . 18n and transferred to the respective recovery machine by the remote recovery manager 16, via a network share or SAN of each recovery machine, for example, for boot up. The host image may appear on the respective recovery machine as a virtual disk, such as a SAN disk.

The RT Rehome program injected into the host image by RT Convert is run by the processing device 42 of each recovery machine 18a, 18b . . . 18n receiving a host image virtual disk. The conversion operations that need to be done on the respective recovery machine 18a, 18b . . . 18n when the host image is booted on the respective remote recovery machine to recover the host image, are controlled by RT Rehome, in this example. RT Rehome runs on the first boot of each remote recovery machine 18a, 18b . . . 18n by the processing device 42 of each recovery machine. The first boot of the remote recovery machine will be a limited boot, such as a safe mode boot, which only boots the operating system. Two limited boot ups may be required.

RT Rehome performs one or more of the following operations in accordance with embodiments of the present invention during the safe mode boot: installs drivers, installs adapters, configures network settings (IP address and network mask, gateway address, DNS address, and/or Windows® Internet Name Service ("WINS") address), add Windows® services, adds registry keys, configures clusters, configures SCSI, ensures that volume mount points and driver letters are assigned as they were on the client machine, updates HAL, if necessary, configures programs on the host image, such as SAN Disk Manager ("SDM") and/or Intelligent Management Agent ("IMA"), available from FalconStor, Inc., Melville, N.Y., to work in new environment by unregistering the IMA from the local backup storage device 26 and registering it to the remote backup storage device 20 (and vice-a versa during failback). In addition, it may disable FalconStor DiskSafe, if it is on the host image, for recovery, to ensure that it does not try to backup over a WAN during recovery, which would slow down the recovery machine. After this is completed, the respective recovery machine is shut down by the RT Rehome and then boots into normal mode. The client machine will then be recovered to a respective recovery machine. If HAL update is required, that may be performed in a first limited boot up, such as a Windows® mini set up, which can then be followed by the second, limited, safe mode boot up, and then the normal boot up.

Figure 7:
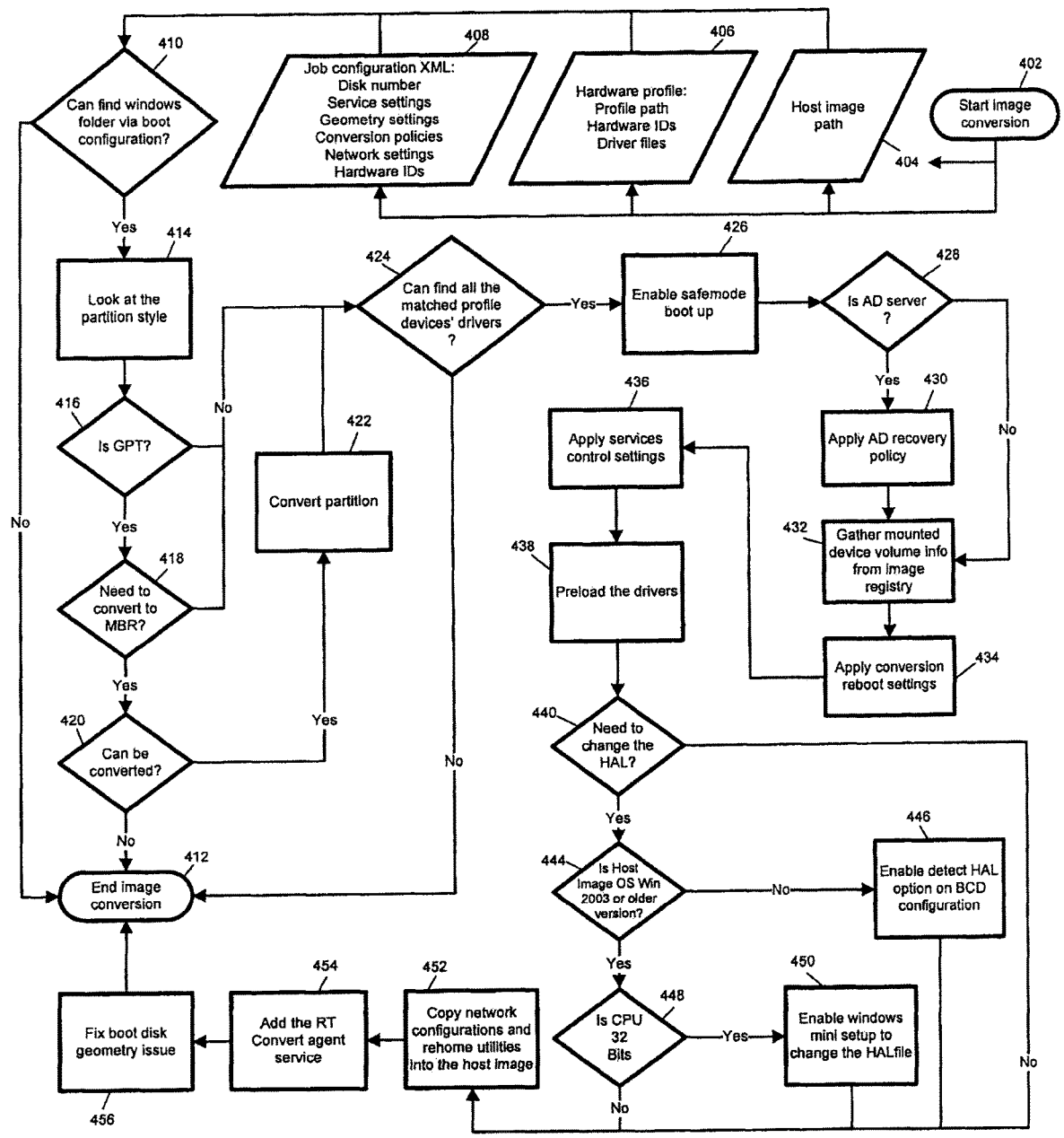
FIG. 7 is a flowchart of an example of a method of image conversion, in accordance with an embodiment of the invention.

FIG. 7 is a flowchart of an example of a method 400 of image conversion by the processing device 28 of the recovery manager 16 under the control of RT Convert, for example, in accordance with an embodiment of the invention. After being informed by a client system 14, that recovery is required, image conversion starts in Step 402. In this example, the host image path to the local backup storage device 26 is loaded to the RT Convert engine 30a, in Step 404. The image path defines the location of the host image for a respective client machine on the local backup server 26, for example. If the local backup device 26 is a SAN device, then the path to the location of the host image on the SAN device is defined. If the local backup device 26 is not a SAN device, the path may be to a network share of the backup storage device, which may be mounted by the recovery manager 16 to run RT Convert on the backup storage device 20, for example.

The MHP XML files are retrieved by the processing device 28 of the recovery manager 16 from the directory and loaded to the RT Convert engine 30a, in Step 406, by the processing device 28 of the remote recovery manager 16.

The job files are loaded to the RT Convert engine by the processing device 28, in Step 406. The job file in this example contains operating system ("OS") related information, such as a disk number assigned to the OS disk of the host image, service settings, geometry settings (such as the location of the start of boot), conversion policies, network settings (including network addresses), power control management, AD recovery policy, and/or hardware IDs, for example.

It is then determined whether a Windows® folder including the driver information (such as folder 32, for example, described above) is found in the host image, in Step 410. If not, then image conversion is ended, in Step 412, because the method of this embodiment of the invention cannot proceed without the driver information.

If Yes, then the RT Convert engine 30a looks at the partition style, in Step 414, to determine whether the partition of the host image is a globally unique identifier ("GUID") partition table ("GPT") (Step 416), used when disks have more than 2 terabytes of data, or a master boot record ("MBR"), used when disks have less than 2 terabytes of data.

If the partition style of the host image is GPT, then it is determined whether it is necessary to convert the partition style to MBR because the respective recovery machine does not support GPT, in Step 418, based on the partition style of the respective recovery machine identified in the respective MHP.

If it is necessary to convert to MBR, it is then determined whether conversion is possible, in Step 420. If not, because the OS disk of the host image is greater than 2 terabytes, then image conversion ends, in Step 412, because the recovery machine cannot support GPT boot.

If it is necessary to convert to MBR, and it is determined that conversion is possible in Step 420, then the partition is converted, in Step 422.

It is then determined whether all the needed device drivers can be found in the MHP of the recovery machine, in Step 424, by comparing the drivers identified in the MHP of a respective recovery machine to the actual drivers in the MHP of that recovery machine. The drivers may include the storage drivers for the boot disk, SCSI controllers, network drivers, video drivers, and/or power control drivers, for example. The drivers are identified by hardware IDs in the MHPs. If all the drivers cannot be found, in this example, image conversion ends, in Step 412.

If the partition style is not GPT (Step 416) or conversion to MBR is not needed (Step 418), the method also proceeds to Step 424 to find all the device drivers. If all the file drivers cannot be found in Step 424, image conversion is ended, in Step 412, because recovery to a recovery machine cannot be provided without all the file drivers.

If all the file drivers can be found in Step 424, safe mode boot up is enabled on the host image by a setting on the OS disk of the host image, in Step 426, so that the first boot up on the recovery machine will be a safe mode boot up.

It is then determined whether the respective machine is an active directory ("AD") server, in Step 428. The active directory server keeps track of users, Exchange servers, computers, and other objects, and includes their security access control information. If the server is an AD server, then the AD recovery policy, which is also in the job file, is applied, in Step 430. The AD recovery policy may include whether the server is an authoritative server, to which an authoritative recovery is to be applied, or not. In an authoritative recovery, the AD server is a master and will synchronize other AD servers, while in a non-authoritative recovery, AD server is a slave and will by synchronized with respect to another AD server.

Mounted device volume information is gathered from an image registry on the host image and recorded in a separate file on the host image for use by RT Rehome, in Step 432. The device volume information includes volume drive letters and mount points on the image, for example, to ensure that all volumes are mounted correctly when the host image boots on the respective recovery machine. If the host image is not for an AD server (Step 428), the process proceeds to Step 432, as well.

Conversion reboot settings are applied, in Step 434, so that the so that the recovery machine boots in safe mode. Service control settings are applied, in Step 436, to allow the conversion process to enable and disable services that may hinder recovery speed and recovery boot. Service control settings may include hardware OEM/vendor specific services that were enabled on the client machine, such as fingerprint identification, RAID software, hardware monitoring or other software related services, such as antivirus, backup software, etc.

The drivers needed to run on the recovery machine are loaded into the host image, in Step 438, from the MHP of the recovery machine. The drivers may be placed in a directory, such as the Windows® System driver directory, for example.

It is then preliminarily determined whether it is necessary to change the HAL, in Step 440, by comparing the HAL in the MHP of the client machine and the MHP of the respective recovery machine, to ensure that the recovery machine has the HAL required to run the host image. If not, the HAL has to be replaced on the host image so that it can be downloaded to the recovery machine.

If HAL replacement is required, it is determined whether the operating system is Windows® 2003 or older version, in Step 444. If not, then the OS version is Windows® 2008 or later, so a detect HAL option on boot configuration data ("BCD") configuration is enabled to change the HAL, during safe mode reboot, in Step 446. If the operating system is Windows® 2003 or older, then it is determined whether the central processing unit is a 32 bit processor, in Step 448. If it is a 32 bit processor, then a limited boot up process, referred to as "Windows® mini setup," is enabled in RT Rehome to change the HAL, in Step 450. A separate boot up is provided for HAL replacement in this example because HAL replacement can be complex, but that is not required. Windows® mini set up may be enabled by modifying the Windows® registry and preparing a Windows® answer file on the host image. RT Convert then configures the first boot on the recovery machine to change the HAL. In this case, the first boot up of the recovery machine is the mini-setup boot up, which will be followed by the safe mode reboot and then a normal reboot.

If the central processing unit of the recovery machine is not a 32 bit processor, then it is a 64 bit processor, and HAL replacement is not required because the HALs are compatible. RT Convert proceeds to copying the network configuration and RT Rehome into the host image, in Step 452. The method proceeds to Step 452 after Steps 446 and 448, as well.

An RT Convert agent service is added, in Step 454, to run RT Rehome on the first boot of the recovery machine.

If the boot disk geometry of the client machine is different than the boot disk geometry of the respective recovery machine, which are both defined in the job file, the boot disk geometry on the host image is modified to conform to that of the recovery machine, in Step 456. Image conversion is ended, in Step 412.

Figure 8:
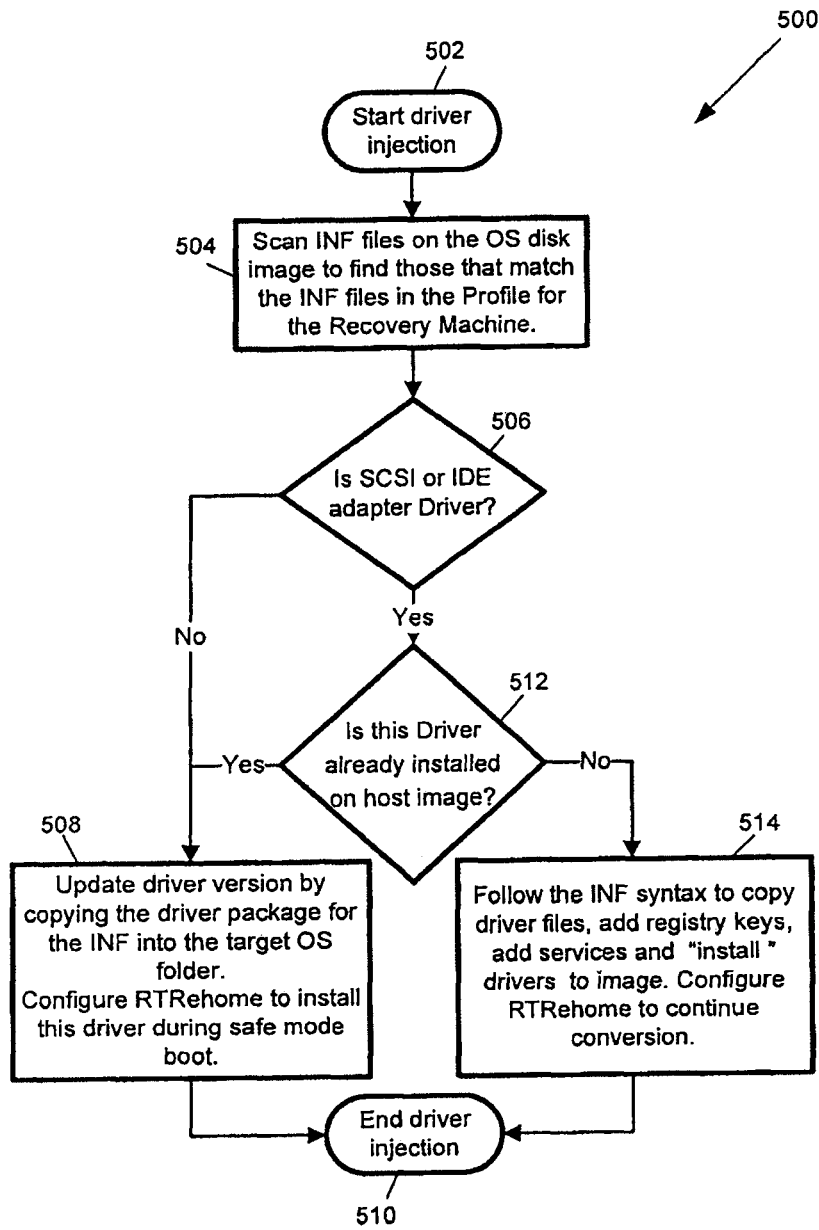
FIG. 8 is a flowchart of an example of a method of injecting of drivers, shown in the method of FIG. 6.

FIG. 8 is a flowchart of an example of a method 500 of injecting drivers, shown in Step 438 of the method 400 of FIG. 6. Driver injection starts in Step 502. Information ("INF") files are scanned on the OS disk of the host image to find INF files that match the INF files in the MHP for the recovery machine, in Step 504. If a match is not found, then the RT Convert process ends, as indicated in Steps 424 and 412 of FIG. 7, as discussed above.

It is then determined whether the driver of the recovery machine is a SCSI or IDE adapter driver, in Step 506. If not, the driver package for the INF adapter driver is copied into the OS folder of the recovery machine, and RT Rhome is configured to install the INF adapter driver during safe mode reboot, in Step 508. Driver injection then ends in Step 510.

If the driver is an SCSI or IDE adapter driver (Step 506), then it is determined whether the driver is already installed on the host image, in Step 512. If yes, then the process moves to Step 508, discussed above, to update the driver version, if necessary.

If not, then the INF syntax is followed to copy the driver files, add registry keys, add services, and install drivers on the host image, in Step 514. In addition, RT Rehome is configured to continue conversion. The process then ends in Step 510.

Figure 9:
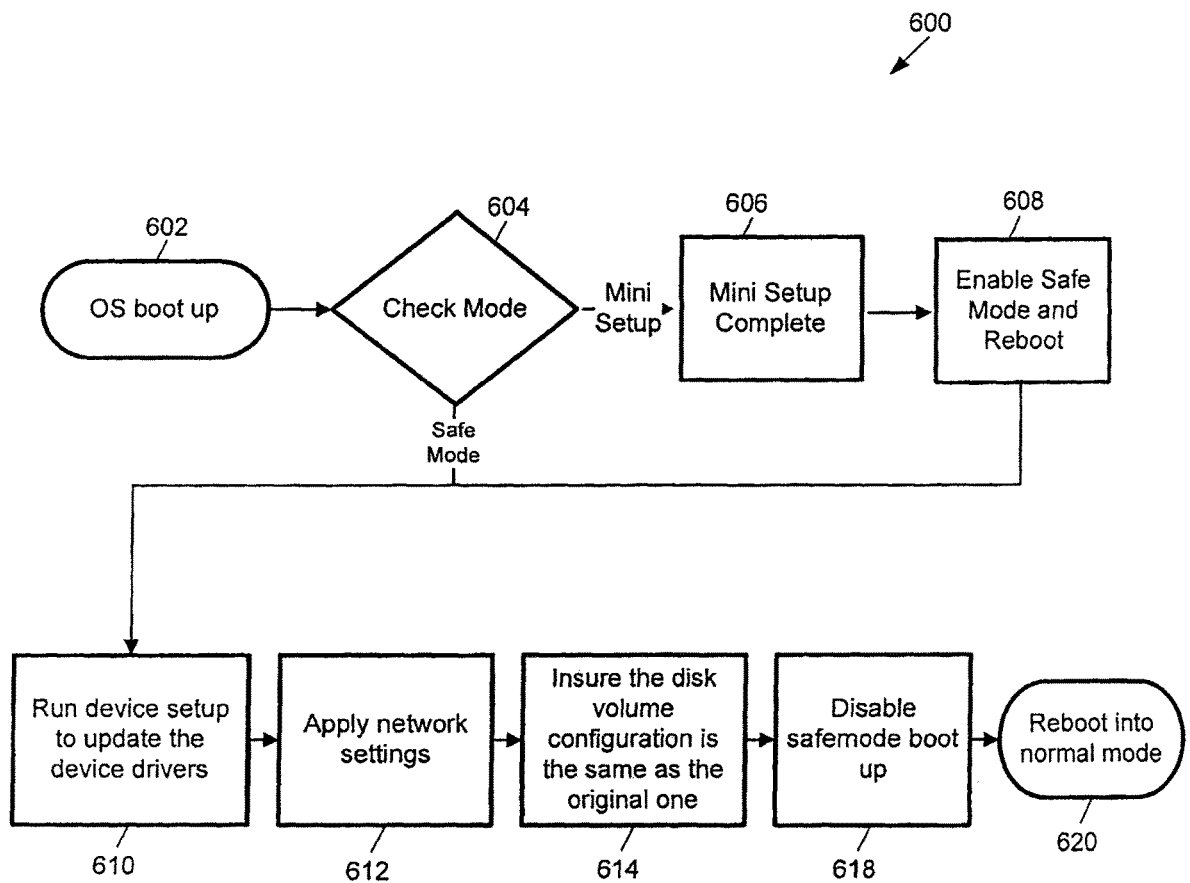
FIG. 9 is a flowchart of an example of a method of booting a recovery machine with the conformed host image of a client machine.

FIG. 9 is a flowchart of an example of the RT Rehome process 600, which is run by the processing unit 42 of the respective recovery machine during the first boot up of the recovery machine, as discussed above. OS boot up starts in Step 602. The boot up mode is determined, in Step 604. If mini set up was enabled during the RT Convert process in Step 450, then the operating system on the host image is first booted in the Windows® mini set up mode, to replace the HAL based on an answer file, in this example, as discussed above.

When mini set up is complete, in Step 606, safe mode is then enabled and safe mode reboot is conducted, in Step 608, to complete other conversions on the recovery machine, in safe mode, in Steps 610-614. RT Rehome checks the host image to determine whether new device drivers are present and if so, device set up of the OS is called to install the device drivers, in Step 608. If mini set-up is not required in Step 604, then the process also proceeds directly to Step 610.

After device setup to update device drivers, in Step 610, network settings, including network addresses, are applied, in Step 612, from the host image, for example. It is then ensured that disk volume configuration on the recovery machine is the same as the original disk volume configuration of the client machine, which is on the host image, in Step 614, by ensuring that all driver letters and mount points are set to the same settings as in the respective client machine, so that applications will run as if on the client machine.

Safe mode boot up is then disabled, in Step 616, to allow the recovery machine to reboot the host image in normal mode, in Step 618. During the normal mode boot up, the operating system, data, and applications that were stored on the hard drive of the respective client machine are loaded to and will run on the recovery machine, so that it will operate as did the respective client machine.

If mini set up was performed, then the boot up process of the recovery machine includes three boot ups, the mini set up boot up, the safe mode boot up, and the normal mode boot up. If mini set up is not performed, then there are two boot ups, the safe mode boot up and the normal mode boot up.

Figure 10:
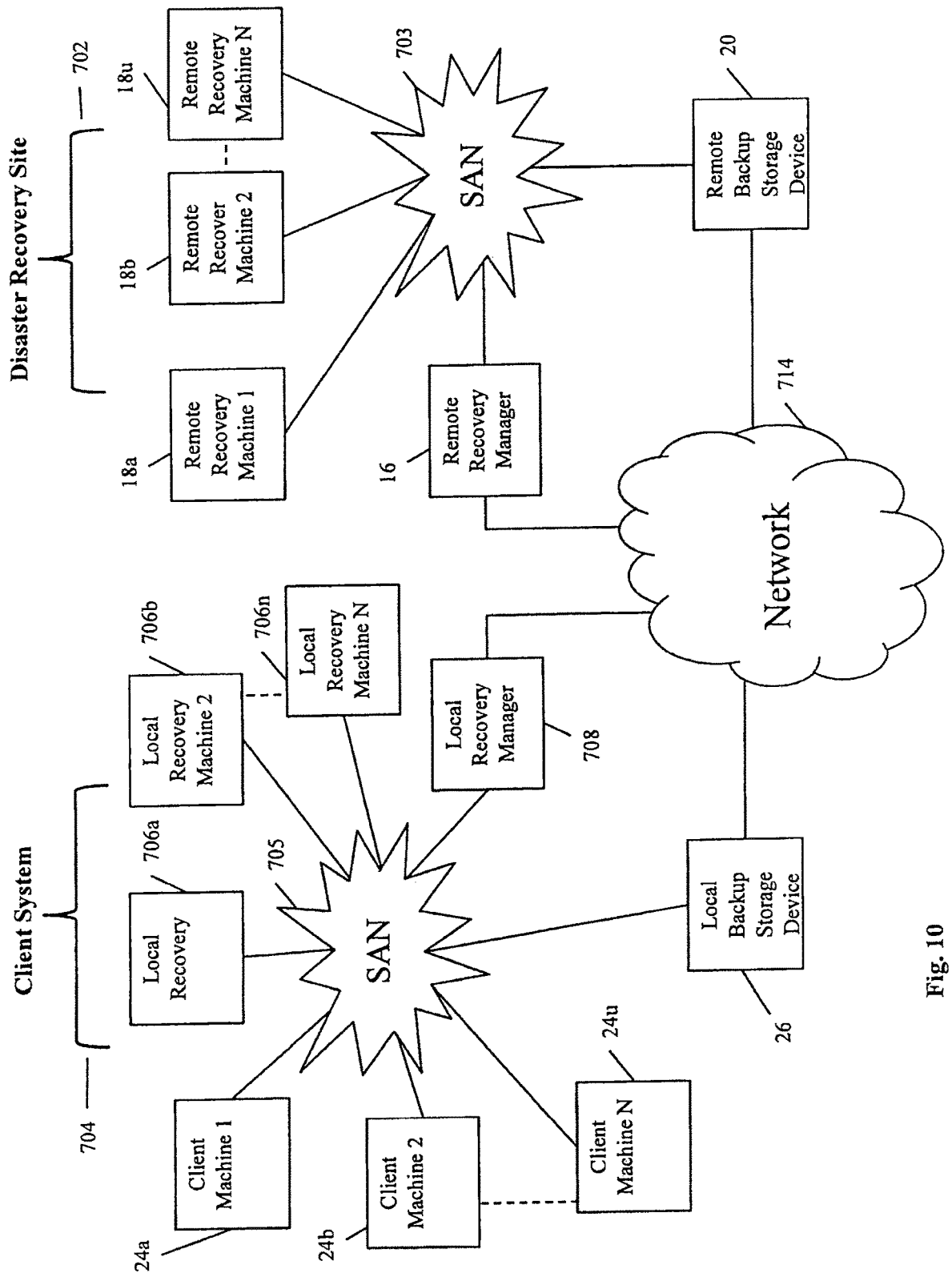
FIG. 10 is another example of a disaster recovery environment in accordance with an embodiment of the invention.

FIG. 10 is another example of a system 700 that may be used in accordance with embodiments of the invention. Components found in FIG. 1 are similarly numbered. In this case, in the disaster recovery site 702, the remote recovery manager 16, the remote recovery machines 18a, 18b . . . 18n, and the remote backup storage device 20 are coupled to a first SAN 703.

Figure 2:
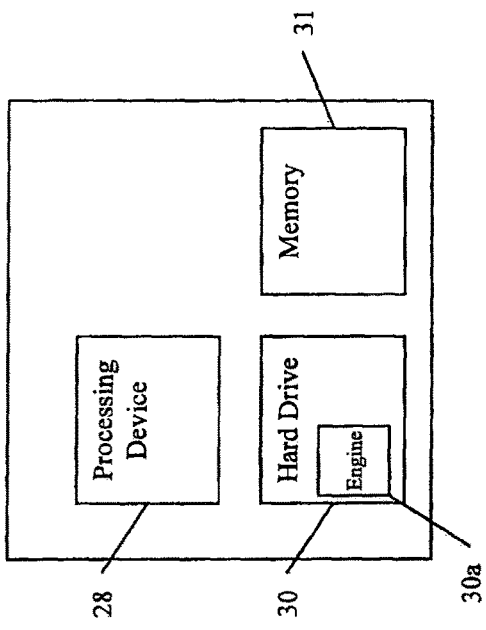
FIG. 2 is a block diagram of an example of a recovery manager, in the embodiment of FIG. 1.

In the client system 704, the client machines 24a, 24b . . . 24n and the local backup storage device 26 are coupled to a second SAN 705. The client machines backup host images to the local backup storage device 26, as described above. In this example, local recovery machines 706a, 706b . . . 706n are provided, coupled to the SAN 705. The local recovery machines may have the same structure as the remote recovery machines 18a, 18b . . . 18c of FIGS. 1 and 3. A local recovery manager 708 is also coupled to the second SAN 705. The local recovery manager 708 may have the same structure as the remote recovery manager 16, of FIGS. 1 and 2.

The disaster recovery site 702 is coupled to the client system 704 through a network 714, which may be a WAN, for example. In particular, the remote recovery manager 16, the remote backup storage device 20, the local backup storage device 26, and the local recovery manager 708 are also coupled to a network 714. The local backup storage device backs up host images from the client machines to the remote backup storage device across the network 714, in manners known in the art, such as by using replication and snapshot markers, for example, as described above. IPStor® may be used, for example, and data deduplication may be provided, as is also described above.

In this example, recovery to the recovery machines 18a, 18b . . . 18c of the disaster recovery site 702 may take place in the same manner as in the example of FIG. 1, described above. In addition, recovery to local recovery machines 706a, 706b . . . 706n may also be provided in accordance with an embodiment of the invention, as long as the local backup storage device 26, the local recovery machines, and the recovery manager 708 are still functioning. The local backup storage device 26, the local recovery machines, and the recovery manager 708 may be separated from the client machines 24a, 24b . . . 24n for protection, but will not be as separated in distance as the disaster recovery site 702.

In this case, the local recovery manager 708 also stores MHPs, XML files, and CAB files for the client machines 24a, 24b . . . 24n and the local recovery machines 706a, 706b . . . 706n, which can be generated by an MHP utility in the same manner as described above. In this example, the MHP utility may be run by the local recovery manager 708, the local backup storage device 26, or the individual client machines. If desired by the client system 704, in response to a crash or disaster effecting one, some, or all of the client machines, but not the local recovery manager 708, the local backup storage device 26, and the local recovery machines 706a, 706b . . . 706c, the host image may be presented to the local recovery manager 708 as one or a plurality of virtual disks, which are mounted by the local recovery manager. The local recovery manager can modify all or the appropriate host images stored on the backup storage device by running RT Convert, and assign the modified host image to a respective local recovery machine 706a, 706b . . . 706n, where they would be booted up in a two step process using RT Rehome, as described above with respect to recovery to the remote recovery machines 18a, 18b . . . 18n. In this case, the conformed host images are provided to respective local recovery machines across the through a network share, for example.

If the disaster disabled the local backup storage device 26 and/or the local recovery manager 708, then the client system 704 would inform the remote recovery manager 16 to recover the host images of the client machines based on the host images backed up to the remote backup storage device 20. RT Convert and RT Rehome would be run, as described above.

Failback to the client machines 24a, 24b . . . 24n, the local recovery machines 706a, 706b . . . 706n, and/or new client machines (not shown) from the disaster recovery site 702 may also be provided in accordance with embodiments of the invention, by switching the roles of the disaster recovery site 702 and the client system 704. Failback may take place in a system configured as in FIG. 1, as well. After recovery, host images may be backed up to the remote backup storage device 20. When the local backup storage device 26, or another such backup storage device is running at the client system 704, the remote backup storage device can backup the host images stored therein to the local backup. To failback, the local recovery manager 708 may act in the same manner the remote recovery manager 16 did for disaster recovery, using the same MHPs, XML, and CAB files for the client machines 24a, 24b . . . 24n, or for the local recovery machines 706a, 706b . . . 706n, which have already been prepared for disaster recovery, or new MHPs, XML, and CAB files may be prepared for new client machines. The local recovery manager 708 may then modify the host images by running RT Convert based on the MHPs so that they can run on the respective client machine (or local recovery machine), and assign the modified host images to the client machines to which failback is to take place. RT Rehome then causes a two or three step boot up, as described above with respect to recovery to the disaster recovery site, so that the host images can run on the respective client machines, local recovery machines, or new client machines at the client system 704.

Examples of implementations of embodiments of the invention are described above. Modifications may be made to those examples without departing from the scope of the invention, which is defined by the claims, below.

We claim:

1. A method of recovering a host image of a physical client machine of a first type to a recovery machine of a second type different from the first type, wherein the host image comprises an operating system, the method comprising:
   comparing, by at least one first processing device separate from the client machine and the recovery machine, a first profile of a client machine of the first type to be recovered to a second profile of a recovery machine of the second type to which the client machine is to be recovered, wherein the first and second profiles each comprise at least one property of the first type of client machine and the second type of recovery machine, respectively;
   conforming at least one property of the host image of the client machine to at least one corresponding property of the recovery machine based, at least in part, on the comparison;
   injecting a program into the host image to run on the recovery machine to control a configuration process to be performed by the recovery machine to run the conformed host image on the recovery machine, by the at least one first processing device;
   providing the conformed host image, including the injected program, to the recovery machine, via a network;
   configuring the recovery machine with at least one conformed property of the host image by at least one second processing device of the recovery machine, by running the injected program by the at least one second processing device, wherein the at least one second processing device is different from the at least one first processing device.

2. The method of claim 1, wherein the host image is stored by a backup storage device associated with the client machine.

3. The method of claim 1, comprising:
   collecting first profile information for a plurality of types of client machines including the first type of client machine and second profile information for a plurality of types of recovery machines including the second type of recovery machine, the profile information comprising at least one property of each type of client machine and each type of recovery machine, respectively;
   forming first and second profiles based on the respective first and second profile information; and
   storing the profile information.

4. The method of claim 1, further comprising:
   providing the host image from the recovery machine to a second client machine, wherein the second client machine is the same as the first client machine, via a network; or
   providing the host image from the recovery machine to a second client machine separate from the first client machine, via a network.

5. The method of claim 1, wherein:
   the first type is a first hardware and/or manufacturer; and
   the second type is a second hardware and/or manufacturer different from the first manufacturer.

6. The method of claim 5, wherein:
   the first type and the second type are each a type of hardware chosen from the group consisting of a server, a desktop computer, a laptop computer, or a work station.

7. The method of claim 1, comprising:
   running the injected program by the at least one second processing device of the recovery machine during at least one boot of the recovery machine to perform the configuration process.

8. The method of claim 7, wherein the backup storage device is a local backup storage device at a location of the client machine, or a remote backup storage device at a data recovery site, the method further comprising:
   receiving the host image from the first backup storage device or from a second backup storage device, via the network, by the first processing device;
   wherein the at least one first processing device and the recovery machine are either at the location of the client machine or at the data recovery site.

9. The method of claim 7, wherein the at least one boot comprises a limited boot.

10. The method of claim 9, wherein the limited boot comprises a safe mode boot.

11. A system for recovering a host image of a client machine to a recovery machine, comprising:
    at least one first processing device;
    at least one recovery machine, each recovery machine comprising at least one second processing device different from the at least one first processing device;
    storage associated with the at least one first processing device to store first respective profiles for a first plurality of types of client machines including a first type of client machine, and second profiles for a second respective plurality of types of recovery machines including a second type of recovery machine different from the first type of client machine, the profiles comprising at least one property of each of the plurality of types of client machines and each of the plurality of types of recovery machines, respectively;
    wherein the at least one first processing device is configured to:
    compare a first profile of a client machine to be recovered to a second profile of a recovery machine to which the host image is to be recovered;
    conform at least one property of the host image of the client machine to at least one corresponding property of the recovery machine based, at least in part on the comparison;
    inject a program into the host image of the client machine to run on the recovery machine to control a configuration process to be performed by the recovery machine to run the conformed host image on the recovery machine; and
    cause transfer of the conformed host image, including the injected program, to the recovery machine, via a network;
    wherein the at least one second processing device is configured to configure the recovery machine with the conformed host image by running the injected program.

12. The system of claim 11, wherein:
    the first processing device and the recovery machine are at a data recovery site;

the storage comprises a local backup storage device at a location of the client machine, or a remote backup storage device at the data recovery site; and the at least one first processing device is configured to receive the host image from the local backup storage device or from the remote backup storage device.

13. The system of claim 11, wherein the at least one first processing device is configured to conform the host image of the client machine to the recovery machine by:
   creating a new host image based, at least in put on the host image; and
   conforming the new host image.

14. The system of claim 11, wherein the first processing device is further configured to:
   provide the host image from the recovery machine to a second client machine, wherein the second client machine is the same as the first client machine, via a network; or
   provide the host image to a second client machine separate from the first client machine, via a network.

15. The system of claim 11, wherein the at least one first processing device is configured to:
   cause collection of at least one of the first respective profile information for the first plurality of types of client machines, and second respective profile information for the second plurality of types of recovery machines, to form the first and/or second profiles, respectively; and
   the at least one first processing device is configured to store the first and second profiles in the storage device.

16. The system of claim 15, wherein the at least one first processing device is configured to cause collection of the first profile information by:
   providing a software utility to a third processing device of a backup storage device or to a third processing device of client machines representative of a plurality of types of client machines, wherein the software utility is configured to cause the third processing device to:
      collect from the client machine the at least one property to form the first profile; and
      send the first profile to the first processing device, via a network.

17. The system of claim 11, wherein the at least one second processing device is configured to configure the recovery machine with the conformed host image by running the injected program during at least one boot of the recovery machine.

18. The system of claim 17, wherein the at least one boot comprises a limited boot.

19. The system of claim 18, wherein the limited boot comprises a safe mode boot.

20. A method of recovering a host image of a client machine of a first type to a recovery machine of a second type different from the first type, wherein the host image comprises an operating system, the method comprising:
   collecting first profile information for a plurality of types of client machines including the first type of client machine and second profile information for a plurality of types of recovery machines including the second type of recovery machine, the profile information comprising at least one property of each type of client machine and each type of recovery machine, respectively;
   forming first and second profiles based on the respective first and second profile information;
   storing the profile information;
   comparing, by at least one first processing device, a first profile of a client machine of a first type to be recovered to a second profile of a recovery machine of a second type to which the client machine is to be recovered, wherein the first and second profiles each comprise at least one property of the first type of client machine and the second type of recovery machine, respectively;
   conforming at least one property of the host image of the client machine to at least one corresponding property of the recovery machine based, at least in part, on the comparison;
   providing the conformed host image to the recovery machine, via a network;
   configuring the recovery machine with at least one conformed property of the host image by at least one second processing device of the recovery machine, wherein the at least one second processing device is different from the at least one first processing device.

21. The method of claim 20, comprising:
   collecting the first profile information for each type of client machine; and
   collecting the second profile information for each type of recovery machine;
   wherein,
   each type of client machine is a combination of 1) a type of operating system and 2) a type of hardware and/or a type of manufacturer; and
   each type of recovery machine is a combination of 1) a type of operating system and 2) a type of hardware and/or a type of manufacturer.

22. The method of claim 20, wherein the at least one first processing device is configured to collect the first profile information by:
   providing a first software utility to a backup storage device and/or to client machines representative of a plurality of types of client machines;
   providing a second software utility to a processing device associated with the recovery machines and/or to recovery machines representative of the plurality of types of recovery machines;
   wherein the first software utility is configured to perform the steps of:
      collecting the at least one property for the client machines representative of the plurality of types of client machines to form the first profile;
   wherein the second software utility is configured to perform the steps of:
      collecting the at least one property for the recovery machines representative of the plurality of types of recovery machines to form the second profiles; and
      sending the first profiles and the second profiles to the first processing device, via a network.

23. The method of claim 22, further comprising collecting the second profile information by loading an operating system of a respective client machine onto a recovery machine to which a host image of the respective client machine is to be recovered, and/or onto each client machine to which a host image of the respective client machine is to be recovered.

24. A system for recovering a host image of a client machine of a first type to a recovery machine of a second type different from the first type, comprising:
   at least one first processing device;
   at least one recovery machine, each recovery machine comprising a respective second processing device different from the at least one first processing device;

storage associated with the at least one first processing device;

wherein one or more of the at least one first processing device is configured to:

cause collection of first profile information for a plurality of types of client machines including a first type of client machine and second profile information for a plurality of types of recovery machines including a second type of recovery machine, the first profile information and the second profile information comprising at least one property of each type of client machine and each type of recovery machine, respectively;

form first and second profiles based on the respective first and second profile information;

store the first profile information and the second profile information in the storage;

compare a first profile of a client machine of a first type from which a host image is to be transferred to a second profile of a recovery machine of a second type to which the host image is to be transferred;

conform at least one property of a host image of the client machine to at least one corresponding property of the recovery machine based, at least in part on the comparison; and provide the conformed host image to the recovery machine, via a network;

wherein the second processing device is configured to configure the recovery machine with the conformed host image during at least one boot of the recovery machine.

25. The system of claim 24, wherein:

the at least one first processing device is configured to collect the first profile information for each type of client machine in a client system; and the at least one second processing device is configured to collect the second profile information for each type of recovery machine at a recovery site;

wherein, each type of client machine is a combination of 1) a type of operating system and 2) a type of hardware and/or a type of manufacturer; and each type of recovery machine is a combination of 1) a type of operating system and 2) a type of hardware and/or a type of manufacturer.

26. The system of claim 24, wherein the at least one first processing device is configured to collect at least the first profile information by:

providing a first software utility to a backup storage device, and/or to client machines representative of the plurality of types of client machines; and providing a second software utility to a processing device associated with the recovery machines and/or to recovery machines representative of the plurality of types of client machines;

wherein the first software utility is configured to perform the steps of:

collecting the at least one property for the client machines representative of the plurality of types of client machines to form the first profiles;

wherein the second software utility is configured to perform the steps of:

collecting the at least one property for the recovery machines representative of the plurality of types of recovery machines to form the second profile; and sending the first profiles and the second profiles to the first processing device, via a network.

27. The system of claim 26, wherein the at least one processing device is further configured to collect the second profile information by loading an operating system of a respective client machine or each client machine onto a respective recovery machine to which a host image of the respective client machine is to be recovered to.

28. A method of recovering a host image of a client machine to a recovery machine, the method comprising:

conforming at least one property of a host image of the client machine to at least one corresponding property of the recovery machine;

injecting a program into the host image to run on the recovery machine to control a configuration process to be performed by the recovery machine to run the conformed host image on the recovery machine, the program being based, at least in part, on the conformed host image;

providing the conformed host image, including the injected program, to the recovery machine, via a network; and running the injected program by the second recovery machine to configure the recovery machine with the conformed host image.

29. A system for recovering a host image of a client machine to a recovery machine, comprising:

at least one first processing device;

at least one recovery machine, each recovery machine comprising at least one second processing device different from the at least one first processing device;

wherein the at least one first processing device is configured to:

conform at least one property of a host image of the client machine to at least one corresponding property of the recovery machine;

inject a program into the host image to run on the recovery machine to control a configuration process to be performed by the recovery machine to run the conformed host image on the recovery machine, the program being based, at least in part, on the conformed host image; and provide the conformed host image, including the injected program, to the recovery machine, via a network;

wherein the second processing device is configured to:

run the injected program to configure the recovery machine with the conformed host image.

* * * * *